United States Patent [19]

Gress et al.

[11] 4,148,856
[45] Apr. 10, 1979

[54] METHOD FOR CONTINUOUS COMPONENT ENCAPSULATION

[75] Inventors: Robert W. Gress, Elmira, N.Y.; Robert W. Sands, Bradford, Pa.

[73] Assignee: Corning Glass Works, Corning, N.Y.

[21] Appl. No.: 498,098

[22] Filed: Aug. 16, 1974

[51] Int. Cl.² .................................................. B29C 6/00
[52] U.S. Cl. ..................................... 264/71; 264/251; 264/272; 264/297
[58] Field of Search ............... 264/272, 277, 251, 297, 264/271, 69, 71; 425/371

[56] References Cited

U.S. PATENT DOCUMENTS

| 918,388 | 4/1909 | Stubbs | 264/69 |
|---|---|---|---|
| 1,481,866 | 1/1924 | Heist | 264/271 |
| 1,610,295 | 12/1926 | Latham | 264/294 |
| 2,141,318 | 12/1938 | Salfisberg | 264/271 |
| 2,758,183 | 8/1956 | Canegallo | 264/272 |
| 2,975,487 | 3/1961 | Williams, Jr. | 264/272 |
| 3,147,324 | 9/1964 | Ward | 264/254 |
| 3,301,932 | 1/1967 | Chisholm | 264/271 |
| 3,352,953 | 11/1967 | Zavitz et al. | 264/71 |
| 3,432,985 | 3/1969 | Halstead | 264/277 |
| 3,717,427 | 2/1973 | Bodine | 264/71 |
| 3,738,895 | 6/1973 | Paymal | 264/46.2 |
| 3,763,300 | 10/1973 | Spanjer | 264/272 |

Primary Examiner—James H. Derrington
Attorney, Agent, or Firm—Walter S. Zebrowski; Clarence R. Patty, Jr.

[57] ABSTRACT

A method of continuously encapsulating a component is disclosed. A predetermined quantity of viscous encapsulating material is applied to each of substantially opposite exterior portions of the component. Thereafter, an external force is applied to the encapsulating material causing it to flow substantially covering the entire exterior surface of the component, after which the encapsulating material is cured.

6 Claims, 9 Drawing Figures

METHOD FOR CONTINUOUS COMPONENT ENCAPSULATION

BACKGROUND OF THE INVENTION

1. Field of the Invention

The present invention relates to a method of encapsulating components, such as electrical components, on a continuous basis.

2. Description of the Prior Art

Electrical components have heretofore been encapsulated by numerous methods including, such for example, as by a molding press, multi-cavity dies, and the like. Such methods have the disadvantages of high initial capital investment in both press and dies, high maintenance cost, low volume production capacity per machine, and the like. Furthermore, prior art methods do not lend themselves to continuous encapsulation of components also resulting in higher costs and lower production.

SUMMARY OF THE INVENTION

The objects of the present invention are to provide a simplified, direct, and inexpensive method of continuously encapsulating components, which method overcomes the hereinabove noted disadvantages.

Briefly, according to the present invention, a component is encapsulated by providing a predetermined quantity of a viscous encapsulating material and applying a portion of the material to substantially opposite exterior areas of the component. A continuous or intermittent exterior force is applied to the encapsulating material on a continuous basis causing it to flow substantially covering the entire exterior surface of the component. Thereafter, the encapsulating material is cured.

Additional objects, features, and advantages of the present invention will become apparent to those skilled in the art from the following detailed description and the attached drawings on which, by way of example, only the preferred embodiments of this invention are illustrated.

DETAILED DESCRIPTION

It is to be noted that the drawings are illustrative and symbolic of the invention, and there is no intention to indicate scale or relative proportion of the elements shown therein. For the purposes of simplicity, the present invention will be described in connection with the encapsulation of electrical components although the present invention is in no way limited to such application.

Figure 1:
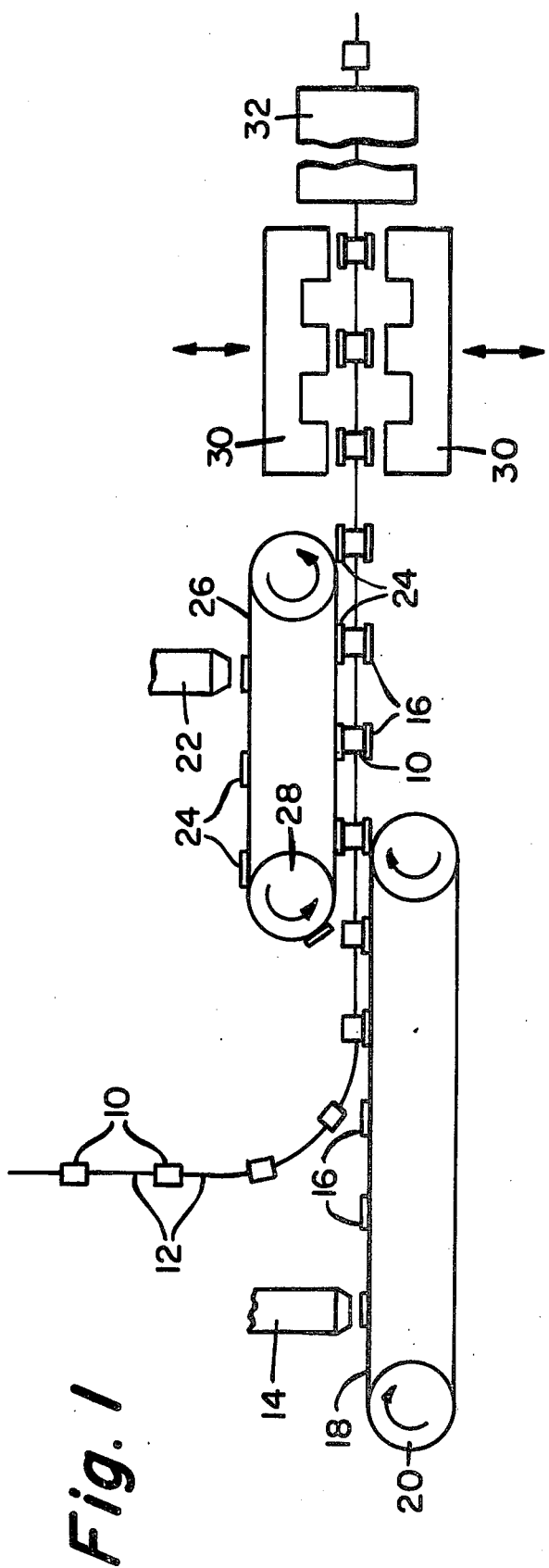
FIG. 1 is a diagrammatic elevation of one apparatus illustrating the process of the present invention.

Referring to FIG. 1, there is shown a continuous supply of electrical components 10 being provided. The components are joined by wires 12 which will ultimately form the component leads. Components 10 are spaced a predetermined fixed distance apart and are fed at a predetermined fixed rate to thereafter facilitate proper application of encapsulating material thereto.

Extrusion nozzle 14 ejects a predetermined quantity of viscous encapsulating material 16 onto a continuous belt 18 driven at a predetermined rate by drive mechanism 20. Extrusion nozzles and continuous belt drives are well known in the art and do not form part of the present invention except as a means of providing a predetermined quantity of an encapsulating material.

A second extrusion nozzle 22 similarly ejects a second predetermined quantity of encapsulating material 24 onto a second continuous belt 26 driven by drive mechanism 28.

As will be understood, the ejection of predetermined quantities of encapsulating material 16 and 24, the speeds of belts 18 and 26, as well as the spacing and speed of components 10 must be synchronized so that each predetermined quantity of encapsulating material 16 is caused to be disposed adjacent to one exterior area of components 10 and applied thereto, and the other predetermined quantity of encapsulating material 24 is disposed adjacent to the substantially opposite exterior area of components 10 and adhered thereto as illustrated in FIG. 1.

After the two predetermined quantities of encapsulating material 16 and 24 are applied to substantially opposite exterior areas of the components 10 the assembly so formed progresses until such assemblies are disposed between a pair of opposite pressure plates 30. When such assemblies are disposed between pressure plates 30, these pressure plates are caused to exert an external force to opposite sides of the assemblies causing the encapsulating material to flow. Such pressure plates may apply a continuous force or an intermittent force, as for example, when plates 30 are connected to a vibrating apparatus. In either event, the spacing between pressure plates 30 determines one of the cross-sectional dimensions of the encapsulated component.

Still further, a second set of pressure plates 32 are disposed adjacent the line of travel of the component assemblies and apply a second external force to the assemblies in a plane substantially perpendicular to the plane of pressure plates 30. Pressure plates 32 may also apply either a continuous or intermittent external force as described in connection with pressure plates 30, and determine the other cross-sectional dimension of the encapsulated component.

After both sets of pressure plates 30 and 32 have acted on the moving components causing the encapsulating material to flow covering the entire exterior surface of the component the encapsulated components are subjected to curing of the encapsulating material in a manner well known in the art. The components may be separated by cutting the lead wires before or after curing. The method and apparatus hereinabove described is particularly suitable for encapsulating square or rectangular cross-sectional components, however, substantially circular or other cross section components may also be encapsulated in this manner. Pressure plates 30 or 32, at the points where they contact the component assemblies, may be suitably shaped so as to impart any desired exterior configuration.

Figure 2:
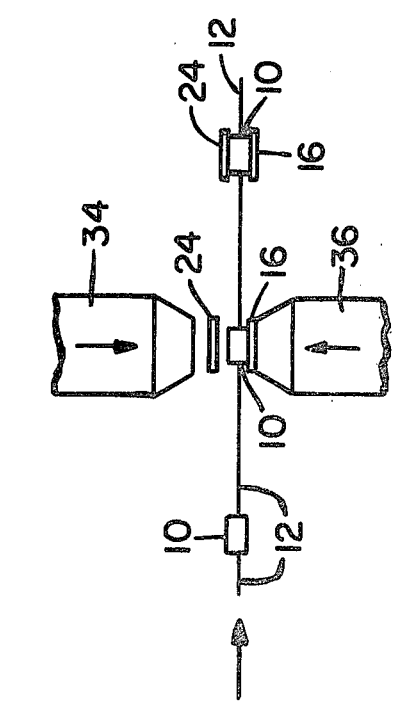
FIG. 2 is a fragmentary elevation of an apparatus illustrating another embodiment of the process of the present invention.

Referring now to FIG. 2, there is shown another means for applying viscous encapsulating material to components 10. A pair of extrusion nozzles 34 and 36 are disposed at opposite sides of the line of travel of components 10. As each component 10 moves in place directly between nozzles 34 and 36, a predetermined quantity of viscous encapsulating material 16 and 24 is ejected from the nozzles and applied directly to the exterior areas of components 10 facing nozzles 34 and 36. After such quantities of encapsulating material are applied to the component, the component then travels to be acted on by pressure plates or as otherwise described herein.

Figure 3:
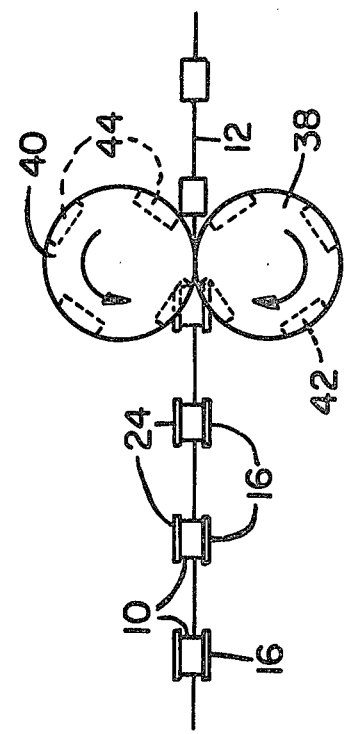
FIG. 3 is a fragmentary elevation of another apparatus illustrating still another embodiment of the present invention.

FIG. 3 illustrates another embodiment of applying external force to cause the viscous encapsulating material to flow and cover the exterior surface of the component. In this embodiment, after the predetermined quantities of encapsulating material 16 and 24 have been applied to components 10 the components are passed through a pair of forming wheels 38 and 40. Forming wheels 38 and 40 have corresponding cavities 42 and 44, respectively, formed in the peripheral surfaces thereof so as to accommodate the component-encapsulating material composites. Cavities 42 and 44 are formed having a configuration such that when they are rotated to an opposing position, they form the desired exterior configuration of the ultimately encapsulated component. As will be understood, forming wheels 38 and 40 must be synchronized so that opposing cavities will surround each component-encapsulating material composite as it moves along its path of travel.

Figure 4:
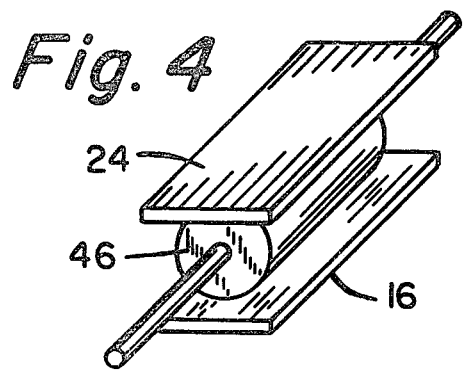
FIGS. 4 and 5 are oblique views illustrating the application of encapsulating material to opposite sides of substantially circular and rectangular component cross sections respectively.
Figure 5:
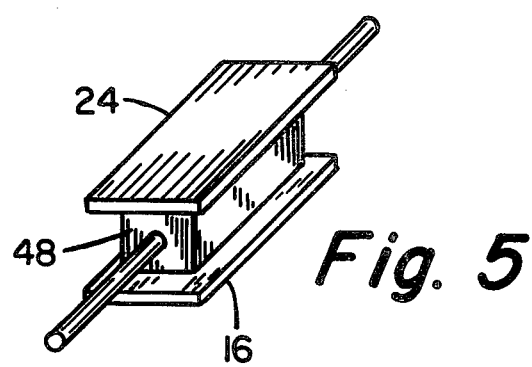

FIG. 4 illustrates a circular cross section component 46 having predetermined quantities of encapsulating material applied to opposing surfaces thereof, while FIG. 5 illustrates a square or rectangular component 48 having predetermined quantities of encapsulating material 16 and 24 applied thereto.

Figure 6:
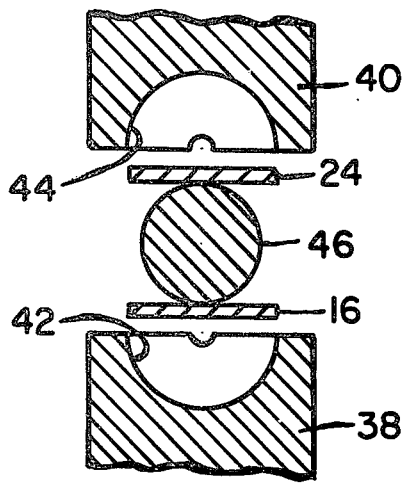
FIGS. 6 and 7 are fragmentary cross-sectional views illustrating the application of an external force to a substantially circular component in accordance with the process of the present invention.
Figure 7:
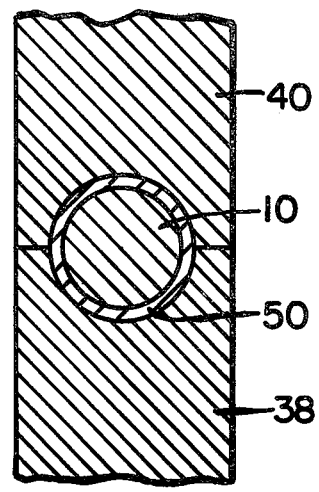

FIG. 6 illustrates an exploded view of a pair of forming wheels 38 and 40 of FIG. 3 with cavities 42 and 44 formed in the peripheral surface thereof. Cavities 42 and 44 are formed to accommodate circular component 46 having predetermined quantities of encapsulating material 16 and 24 applied to opposing surfaces thereof. FIG. 7 illustrates forming wheels 38 and 40 in their normal relationship to one another exerting an external force on the encapsulating material to form an encapsulating coating 50 about component 46. As is seen, the encapsulating material is caused to flow covering the entire exterior surface of the component.

Figure 8:
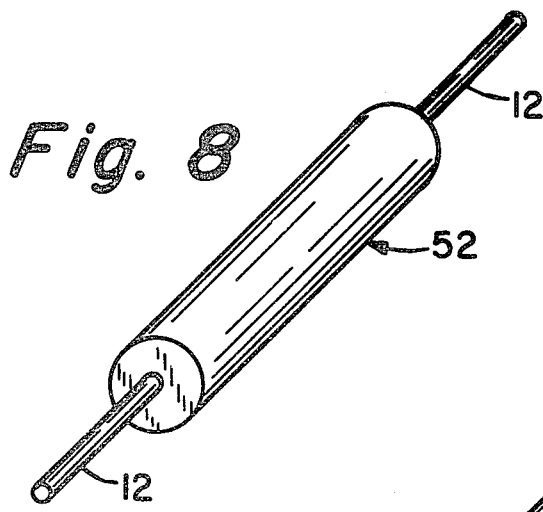
FIGS. 8 and 9 are oblique views of substantially circular and rectangular cross-sectional components, respectively, encapsulated in accordance with the process of the present invention.
Figure 9:
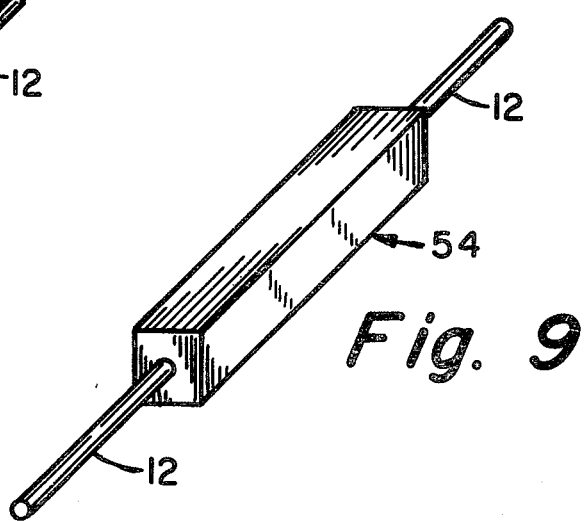

FIGS. 8 and 9 show substantially circular cross section component 52 and a square or rectangular cross section component 54 each with an encapsulating coating thereon with wires 12 severed to form component leads.

Suitable examples of viscous encapsulating materials are polyester resin compositions, polybutadiene resin compositions and the like which may include reactive monomers, catalysts, and the like. One familiar with the art can readily select a suitable encapsulating material. A typical example of the present invention is as follows. A continuous supply of electrical resistors having connecting wires embedded in the ends thereof or connected thereto is provided. A pair of extrusion nozzles are disposed in an opposing relationship on either side of the path of travel of the interconnected electrical resistors. A predetermined quantity of a viscous encapsulating material, such as a polyester resin composition, is simultaneously ejected from the extrusion nozzles and applied to opposite sides of each resistor as it passes. The resistors travel at the rate of 60 pieces per minute. A pair of forming wheels are also disposed on either side of the path of travel of the resistors, the wheels having in their peripheral surface a plurality of cavities disposed so that one cavity in one wheel engages the component with the encapsulating material applied thereto simultaneously as one cavity in the second wheel engages this same component. As the component with the encapsulating material passes the corresponding cavities close applying an external force to the encapsulating material causing it to flow substantially covering the entire exterior surface of the component, the pair of cavities determining the exterior shape and size of the encapsulated component. The forming wheels are synchronized with each other and with the speed of the traveling electrical components.

After each component is thusly encapsulated, the components pass through a furnace at a temperature of 180° C. and remain therein for less than about one minute while the encapsulating material is cured. Thereafter, the encapsulated components are cut apart and further processed as desired.

Although the present invention has been described with respect to details of certain embodiments thereof, it is not intended that such details be limitations upon the scope of the invention except insofar as set forth in the following claims.

We claim:

1. A method of encapsulating a component comprising the steps of
    providing a quantity of viscous encapsulating material,
    adhering a portion of said encapsulating material directly to one exterior surface area of said component,
    adhering another portion of said encapsulating material directly to another exterior surface area of said component, the adhesion of encapsulating material to each exterior surface area comprises ejecting a predetermined quantity of encapsulating material from an extrusion nozzle directly to said areas, thereafter
    disposing said component and said portions of said encapsulating material between a pair of force members,
    applying an external force by said force members to both of said portions of said encapsulating material simultaneously causing said encapsulating material to flow substantially covering the entire exterior surface of said component, and thereafter
    curing said encapsulating material.

2. A method of encapsulating a component comprising the steps of
    providing a quantity of viscous encapsulating material,
    adhering a portion of said encapsulating material directly to one exterior surface area of said component,
    adhering another portion of said encapsulating material directly to another exterior surface area of said component, thereafter disposing said component and said portions of said encapsulating material between a pair of vibrating pressure plates, applying an external force by said pressure plates to both of said portions of said encapsulating material simultaneously causing said encapsulating material to flow substantially covering the entire exterior surface of said component, and thereafter curing said encapsulating material.

3. A method of encapsulating a component comprising the steps of providing a quantity of viscous encapsulating material, adhering a portion of said encapsulating material directly to one exterior surface area of said component, adhering another portion of said encapsulating material directly to another exterior surface area of said component, thereafter disposing said component and said portions of said encapsulating material between a pair of forming wheels, applying an external force by said forming wheels to both of said portions of said encapsulating material simultaneously causing said encapsulating material to flow substantially covering the entire exterior surface of said component, and thereafter curing said encapsulating material.

4. A method of encapsulating a component comprising the steps of providing a quantity of viscous encapsulating material, depositing two predetermined quantities of said encapsulating material on an intermediate surface, transferring one of said predetermined quantities of said encapsulating material from said intermediate surface directly to one exterior surface area of said component and adhering said encapsulating material thereto, transferring the other of said predetermined quantities of said encapsulating material from said intermediate surface directly to another exterior surface area of said component and adhering said encapsulating material thereto, thereafter disposing said component and said predetermined quantities of said encapsulating material between a pair of force members, applying an external force by said force members to both of said portions of said encapsulating material simultaneously causing said encapsulating material to flow substantially covering the entire exterior surface of said component, and thereafter curing said encapsulating material.

5. A method of encapsulating a component comprising the steps of interconnecting a plurality of components by wires at predetermined intervals and causing said components to travel along a predetermined path, providing a quantity of viscous encapsulating material, adhering a portion of said encapsulating material directly to one exterior surface area of each said component, adhering another portion of said encapsulating material directly to another exterior surface area of each said component, thereafter disposing each said component and the respective portions of said encapsulating material between a pair of force members, applying an external force by said force members to both of said portions of said encapsulating material simultaneously causing said encapsulating material to flow substantially covering the entire exterior surface of each said component, thereafter curing said encapsulating material, and severing said wires after the encapsulating material is cured to form individual components.

6. A method of encapsulating a component comprising the steps of providing a quantity of viscous encapsulating material, applying a first portion of said encapsulating material to one moving belt, applying a second portion of said encapsulating material to another moving belt, transferring said first portion of said encapsulating material from said one moving belt and adhering it to one exterior surface area of said component, transferring said second portion of said encapsulating material from said another moving belt and adhering it to another exterior surface area of said component, thereafter disposing said component and said portions of said encapsulating material between a pair of force members, applying an external force by said force members to both of said portions of said encapsulating material simultaneously causing said encapsulating material to flow substantially covering the entire exterior surface of said component, and thereafter curing said encapsulating material.

* * * * *